United States Patent [19]

Muraoka et al.

[11] Patent Number: 5,222,054
[45] Date of Patent: Jun. 22, 1993

[54] SEEKING OPERATION CONTROL APPARATUS IN AN OPTICAL DISK READER

[75] Inventors: Masaru Muraoka; Syozo Takegawa, both of Daito, Japan

[73] Assignee: Funai Electric Co., Ltd., Osaka, Japan

[21] Appl. No.: 760,928

[22] Filed: Sep. 17, 1991

[30] Foreign Application Priority Data

Apr. 23, 1991 [JP] Japan .......................... 3-37882[U]

[51] Int. Cl.[5] .............................................. G11B 17/22
[52] U.S. Cl. ................................... 369/32; 369/44.28; 360/78.05
[58] Field of Search ............... 369/32, 44.28, 44.27, 369/44.29, 54, 111, 33, 43, 44.11, 44.31, 56, 58, 44.35; 360/78.05, 77.02

[56] References Cited

U.S. PATENT DOCUMENTS

| | | | |
|---|---|---|---|
| 4,701,898 | 10/1987 | Giddings | 369/32 |
| 4,774,699 | 9/1988 | Giddings | 369/32 |
| 4,866,687 | 9/1989 | Kasai et al. | 369/32 |
| 5,042,019 | 8/1991 | Kitai et al. | 369/32 |
| 5,136,560 | 8/1992 | Hangai et al. | 369/32 |

Primary Examiner—Robert J. Pascal
Assistant Examiner—Ali Neyzari
Attorney, Agent, or Firm—Dickstein, Shapiro & Morin

[57] ABSTRACT

A seeking operation control apparatus in an optical disc reader reads track information stored in an optical disc with an optical pickup which is movable in the radial direction in order to seek a desired track. It includes a calculator for calculating track values, a jump driver, a jump controller, and a reading controller. The calculator calculates the number of tracks in the distance between the track onto which the optical pickup is positioned and a desired track based upon track information obtained by the optical pickup. The jump driver induces the optical pickup to jump one or more predetermined tracks. The jump controller controls the jump driver whereby it performs the track jump operation repeatedly as required to make the optical pickup jump the track value calculated by the calculator. The reading controller directs the optical pickup to read track information after the jump control operation is completed. Accordingly, the optical disc reader is able to seek the desired track in minimal time, since it does require that track information be read as often as conventional readers do.

14 Claims, 5 Drawing Sheets

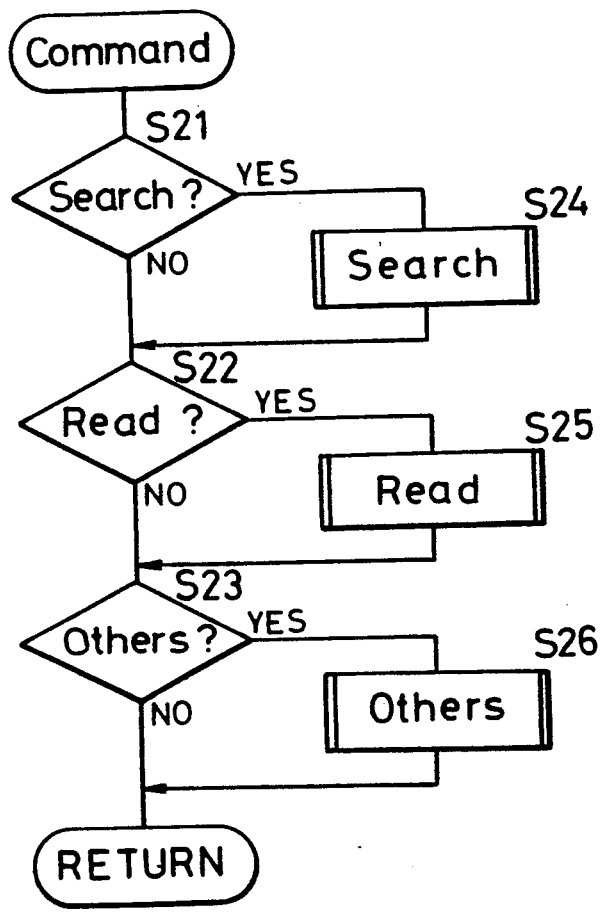
F I G. 4

SEEKING OPERATION CONTROL APPARATUS IN AN OPTICAL DISK READER

BACKGROUND OF THE INVENTION

The present invention relates to a seeking operation control apparatus in an optical disc reader. More specifically, it relates to a seeking operation control apparatus in an optical disc reader which seeks a desired track on an optical disc by a rough access operation followed by a finishing access operation.

The compact disc (hereinafter referred to as CD), a type of optical disc, has become very popular and has superseded the LP record in the field of audio reproduction systems. In conjunction with the more widespread use of CDs, the CD as a read-only memory (CD-ROM) has come into standardization. The CD-ROM is a 12 cm-diameter CD for storing data and programs, from which a computer can read the information stored.

Comprising a spiral line on the CD-ROM are the tracks which store information, including information as to the tracks themselves. Seeking a desired track, an optical disc reader first performs a rough access operation followed by a finishing access operation. During the rough access operation, the optical disc reader calculates the number of tracks to be jumped and drives an optical pickup to jump the tracks to approximately the desired position, in a lower accuracy phase. Then, the optical disc reader reads track information from the track onto which the optical pickup has been located, and calculates the number of tracks still to be jumped. If the finishing access operation is permissible, i.e., provided that the optical pickup is located within an area which includes the precise position desired, then under control by the optical disc reader, the optical pickup jumps tracks accurately, whereupon the optical pickup reads current track information again. The optical disc reader locates the optical pickup precisely to the desired track by repeating the above seeking operations.

The seeking speed of the optical disc reader utilizing the above operations is superior to that of magnetic tape readers, yet it is inferior to that of hard disc readers. Therefore, faster search operation in optical disc readers has been an object of research.

A conventional optical disc reader requires a considerable period of time in order to position the optical pickup onto the desired track, since it reads track information after every track jump, which amounts to several times in the finishing access operation. The track-information reading operation costs a certain length of time, resulting in prolonged seeking time, due to the fact that many processes (correction for example) are involved in the track-information reading operation.

Another optical disc reader performs various types of jump operations in which one-track jumps, three track jumps, five-track jumps, etc. are involved, and selects the proper category of jump depending upon the number of calculated tracks to be jumped. However, due to the necessity of selecting a jump type, this optical disc reader requires complex control, which in turn must be implemented by complex software.

SUMMARY OF THE INVENTION

It is an object of the present invention to provide a seeking operation control apparatus in an optical disc reader which executes its seeking operation in minimal time, and under simplified control.

A seeking operation control apparatus in an optical disc reader according to the present invention reads track information stored in an optical disc be means of an optical pickup which, in order to search a desired track, is movable in the radial direction. It includes a calculator for calculating track values, a jump driver, a jump controller, and a reading controller.

The calculator calculates the number of tracks in the radial distance between a track onto which the optical pickup is positioned and a desired track based upon track information obtained by the optical pickup. The jump driver makes the optical pickup jump one or more predetermined tracks. The jump driver, under the control of the jump controller, performs the track jump operation repeatedly, so as to make the optical pickup jump the track value calculated by the calculator. The reading controller then directs the optical pickup to read track information subsequent to completion of the jump control operation.

In the conventional optical disc reader, the operation in which track information is read is repeated after every track jump, whereas an optical disc reader according to the present invention performs track jump repetitions, and then reads the track information once. Accordingly, an optical disc reader incorporating the search operation control apparatus of the present invention is able to seek the desired track in minimal time, since it does not require that track information be read as often as conventional readers do.

These and other objects and advantages of the present invention will be more fully apparent from the following detailed description.

BRIEF DESCRIPTION OF THE DRAWINGS

FIG. 4 is a flow chart showing command process; and

DESCRIPTION OF THE PREFERRED EMBODIMENT

Figure 1:
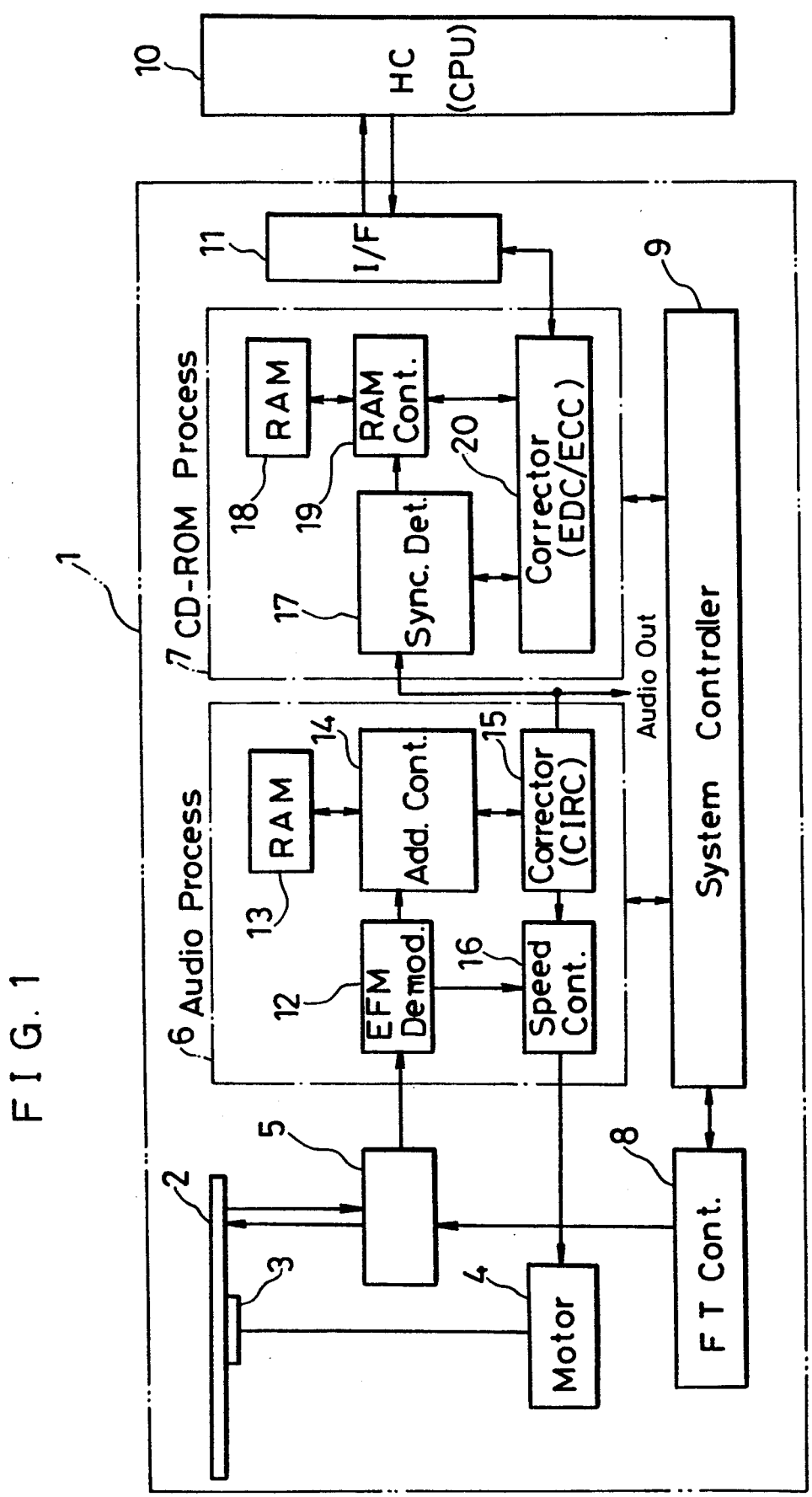
FIG. 1 is a block diagram showing a CD-ROM driver including a search operation control apparatus according to the present invention.

Referring to FIG. 1, a CD-ROM driver 1 (hereinafter referred to as the driver 1) includes a search operation control apparatus according to the present invention.

The driver 1 principally includes a disc retainer 3 for retaining a disc 2; a spindle motor 4 for rotating the disc 2; an optical pickup 5 for reading information from the disc 2; an audio-digital signal processor 6; a CD-ROM digital signal processor 7; a servocontroller 8 for controlling the focus and tracking of the optical pickup 5; a system controller 9 including a micro computer; and an interface 11 for communicating with a host computer 10.

The disc 2 has information tracks composed of a spiral line. The spindle motor 4 is capable of rotating the disc 2 at a constant linear velocity in correspondence with control signals from the audio digital signal processor 6. The optical pickup 5 irradiates the disc 2 with a spotting beam and reads the information on the disc 2 by detecting the reflected light. The optical pickup 5 is movable in the radial direction along the disc 2. The optical pickup 5 has an objective lens 27 (shown in FIG. 2) for focusing its spotting beam by movement both in the radial direction along the disc 2, and in the direction of the disc's thickness. The servocontroller 8 directs the tracking and the focusing of the optical pickup 5, and also directs a thread servocontroller 23 (FIG. 2) to move the optical pickup 5 in the radial direction.

The audio digital signal processor 6 includes an eight-to-fourteen modulation (EFM) demodulator 12 which receives signals from the optical pickup 5; a RAM 13 for storing data; and an address controller 14 which controls reading from and writing to the RAM 13; a corrector 15 for correcting data by means of a Cross Interleaved Read-Solomon Code (CIRC); and a speed controller 16 for controlling the speed of the spindle motor 4. The EFM demodulator 12 demodulates the data in eight-to-fourteen modulation stored in the disc 2. The speed controller 16 outputs drive signals for controlling the speed of the spindle motor 4 by means of obtained track information. The speed controller 16 so controls the spindle motor 4 that the disc 2 has a constant linear velocity during data retrieval, and achieves the linear velocity corresponding to a desired track by acceleration or deceleration. The address controller 14 de-interleaves the interleaved data in the RAM 13. The output of the corrector 15 is applied to the CD-ROM digital signal processor 7. The output may alternatively be delivered to the exterior in the form of audio signals.

The CD-ROM digital signal processor 7 includes a synchronization detector 17; a RAM 18 for storing reproduced data; a RAM controller 19 which controls writing to and reading from the RAM 18; and a corrector 20 for correcting signals by means of error check codes (ECC), error detecting codes (EDC), etc., specifically for application to a CD-ROM. The synchronization detector 17 detects synchronization signals in the data which have been processed by the audio-digital signal processor 6. The synchronization detector 17, upon detecting the synchronization signals, descrambles the data which have been scrambled. The RAM controller 19 compares header addresses in the reproduced data with the data stored in the RAM 18.

Figure 2:
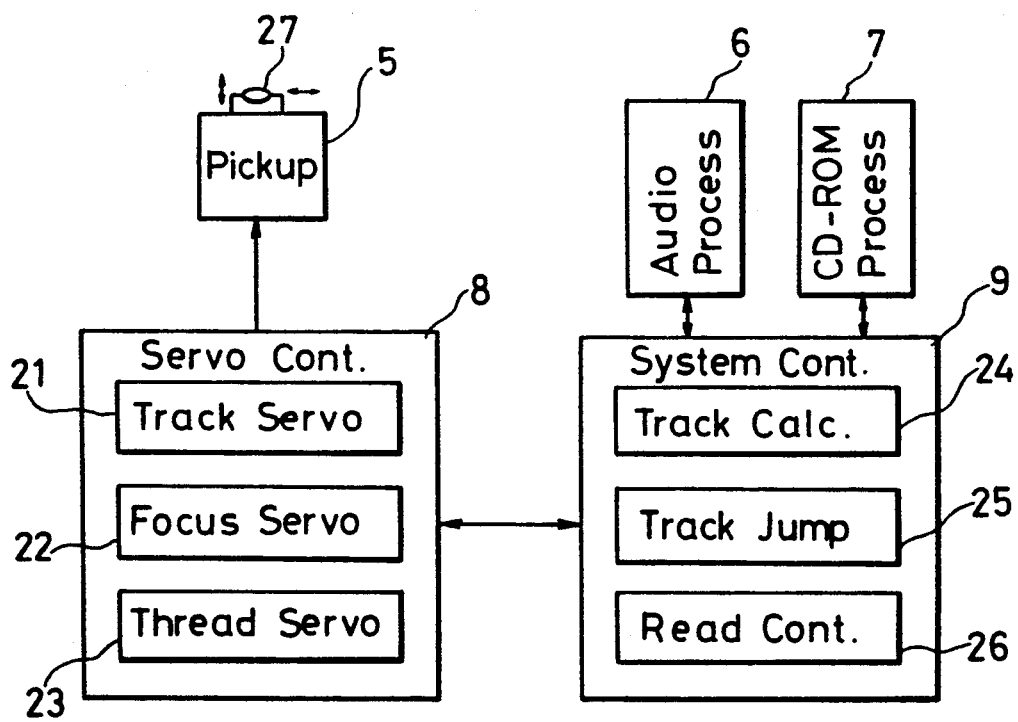
FIG. 2 is a functional block chart showing a servo-controller and a system controller.

FIG. 2 shows the functional structure of the servocontroller 8 and the system controller 9. The servocontroller 8 includes a track servocontroller 21, a focus servocontroller 22 for focusing the objective lens 27, and a thread servocontroller 23 for moving the optical pickup 5 in the radial direction along the disc 2. The track servocontroller 21 controls the objective lens 27 during tracking in order to execute either one-track or ten-track jumps.

The system controller 9 includes a calculator 24 which calculates track values, a jump controller 25 which controls the track servocontroller 21 executing either a one-track jump or a ten-track jump, and a reading controller 26 under which control the optical pickup 5 reads track information after the track jump. The calculator 24 calculates the track value using the track information of the track to which the optical pickup 5 is positioned at the time and the desired track information. The calculating method will be described below.

Figure 3:
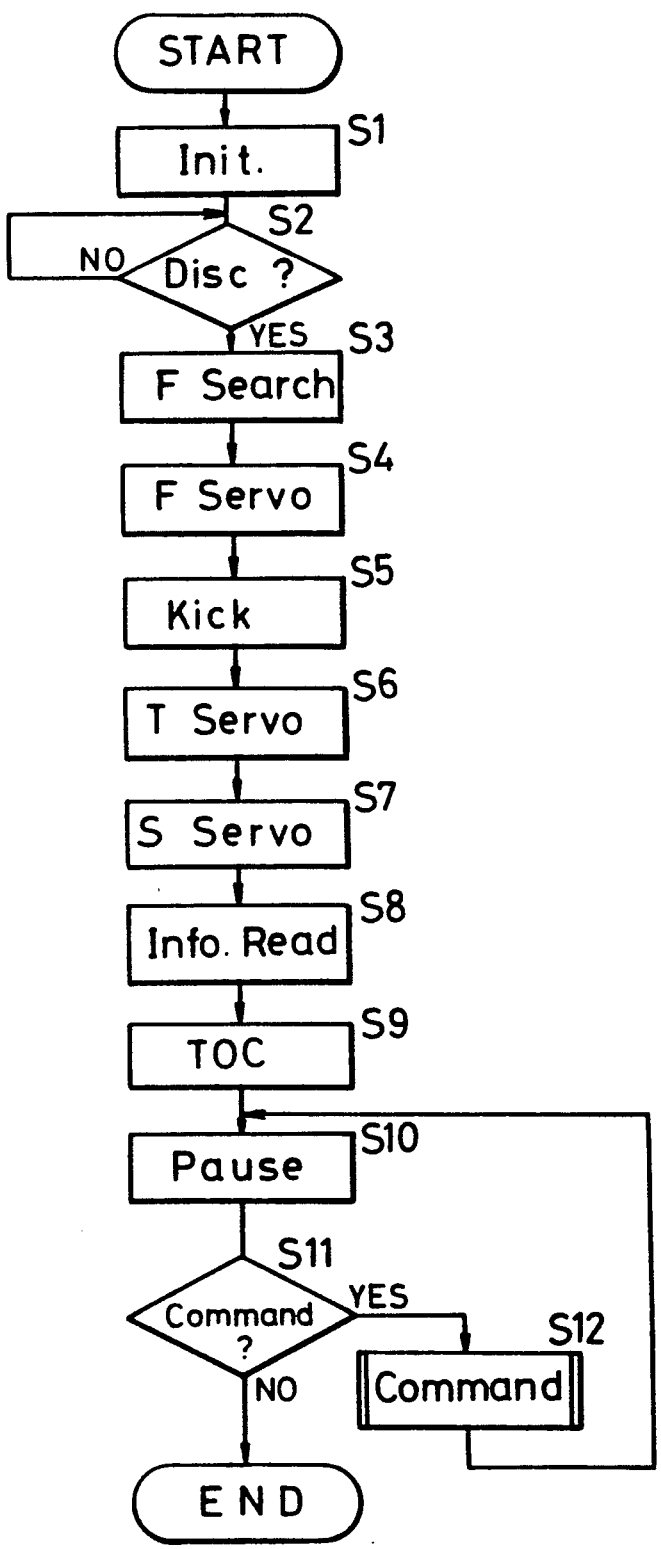
FIG. 3 is a flow chart showing operation of the system controller in brief.

Referring to FIG. 3, which shows a brief flow chart of the control process of the system controller 9, control operations in the driver 1, structured as thus in the above, will be described.

When a power source switch (not shown) is closed, an initialization process is carried out at step S1 which includes initialization of the RAMs 13 and 18 and setting of the optical pickup 5 into the initial position. At step S2, it is decided if the disc 2 is loaded on the disc retainer 3. If the disc 2 is loaded, step S3 is then executed. At step S3, the servocontroller 8 is commanded to perform a focus search, wherein the spotting beam with which the optical pickup 5 irradiates the disc 2 is focused into a predetermined diameter. After the focus search, the servocontroller 8 is commanded to start the focus servocontrol process at step S4. During the focus servocontrol process, the object lens 27 of the optical pickup 5 is controllably driven to compensate for deviations on the surface of the disc 2.

At step S5, the speed controller 16 is commanded to start a spindle-kick control process, wherein the speed controller 16 sends drive signals to the spindle motor 4 to start rotation. At step S6, the servocontroller 8 is commanded to start the tracking servocontrol process. Servocontrol in tracking functions to controllably move the objective lens 27 of the optical pickup 5 in the radial direction along the disc 2, in order to make the spotting beam trace a track on the disc 2. At step S7, the speed controller 16 is commanded to start servocontrol to the spindle, wherein the spindle motor 4 is controllably rotated at a speed corresponding to the position of the optical pickup 5 with respect to the radial direction, in order to maintain the disc 2 at a constant linear velocity.

Following the spindle servocontrol start at step S7, step S8 is executed, at which information which is written at the head of each block of tracks on the disc 2 is read from the current track. At step S9, the table of contents (TOC) of the disc 2, which is written on the inner most portion of the disc, is scanned and read, wherein the information is stored in a memory in the system controller 9.

At step S10, a pause of a predetermined period is executed, and then at step S11 the driver 1 waits for a command from the host computer 10. When a command from the host computer 10 is received, step S12 is executed, upon which the command process described below is carried out, and after which the program returns to step S10. In case no command is inputted at step S11, the program ends.

FIG. 4 is a flow chart showing the command process at step S12. At step S21, it is determined whether the command from the host computer 10 is a command to start a seeking operation. Then at step S22, it is determined whether the command is a command to start a data reading operation. At step S23, it is determined whether the command is a command to start other operations.

When the command is to start a seeking operation, the program runs from step S21 to step S24 so as to perform the search operation. Then the program goes on to step S22. When the command is to start a data reading operation, the program runs from step S22 to step S25 so as to perform the data reading operation. Then the program goes on to step S23. When the command is to start other operations, the program runs from step S23 to step S26 so as to start those operations. Then the program goes back to the main routine.

Figure 5:
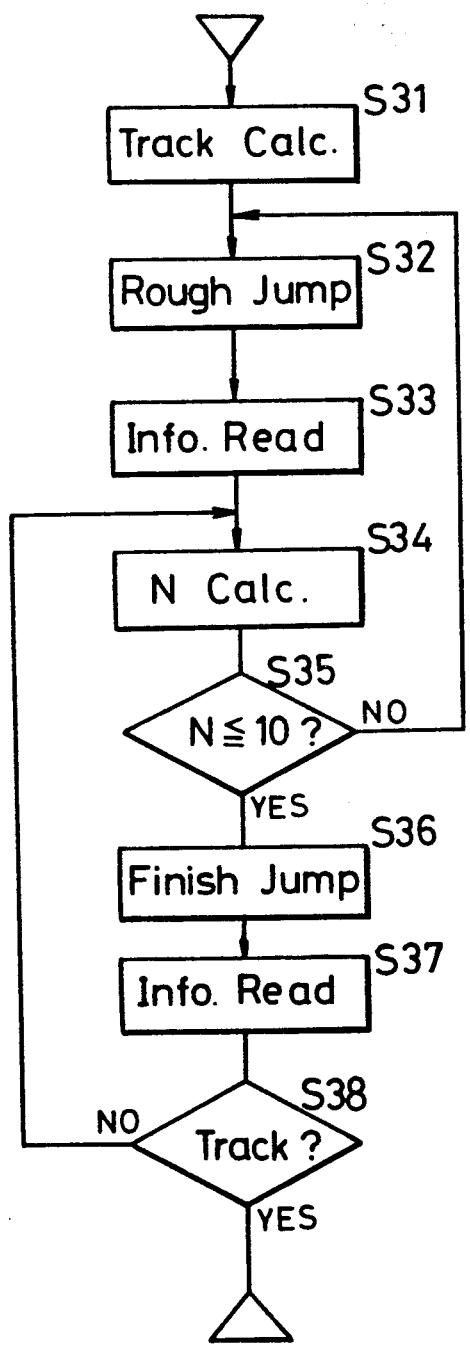
FIG. 5 is a flow chart showing control process for moving an optical pickup during search process.

FIG. 5 shows processes for controlling the movement of the optical pickup 5 in the search process at step S24.

Receiving a seeking command from the host computer 10, the system controller 9 at step S31 searches its TOC-storing memory for the track which stores the desired data and then calculates the number of tracks between the current position of the optical pickup 5 and the desired track.

The number of tracks is calculated in the following manner:

Since each track of the disc 2 has its address defined in terms of elapsed-time intervals in tracking from the innermost track, the following equation is provided.

$$\pi \times r_2^2 - \pi \times r_1^2 = v \times 0.0016 \times P$$

where
$r_1$: radius of innermost track
$r_2$: radius of current track
v: linear velocity (mm/sec) of data stored on disc
0.0016: track pitch
P: MP×60+SP+TP/75
(wherein MP is minutes, SP is seconds, and TP is track number in address of current track)
Accordingly, $$r_2 = [(v \times 0.0016 \times P + \pi \times r_1^2)/\pi]^{\frac{1}{2}}$$

and $$r_3 = [(v \times 0.0016 \times Q + \pi \times r_1^2)/\pi]^{\frac{1}{2}}$$

where
Q: MQ×60+SQ+TQ/75
$r_3$: radius of desired track
(wherein MQ is minutes, SQ is seconds, and TQ is track number in address of desired track)
The distance $\Delta r$ is calculated by the following formula from the radius $r_2$ of the current track and the radius $r_3$ of the desired track.

$$\Delta r = |r_3 - r_2|$$

Then, the track value is calculated by dividing the distance $\Delta r$ by the 0.0016 mm track pitch.

At step S32, the rough access operation is performed, in which the optical pickup 5 jumps the number of tracks calculated to the desired position. The track-jump operation is performed by applying a predetermined amount of voltage to the motor in order to drive the optical pickup 5 for a period of time corresponding to the calculated track value. This results in an error of approximately ±2% in terms of the positioning of the optical pickup 5. At step S33, the system controller 9 reads the track information following the positioning of the optical pickup 5, and then at step S34 it calculates the number M of tracks to be crossed further using the difference between the read track information and the desired track. At step S35, it is determined whether the number N of the tracks to be crossed further is ten or less. If the number N is over ten, the program returns to step S32 to perform the rough access operation again.

When the number N of tracks is ten or less at step S35, step S36 is executed. At step S36, the finishing access operation is carried out, in which the optical pickup 5 jumps over N tracks one by one. That is, in the finishing access operation, the optical pickup 5 jumps precisely each of the N tracks. Next, the track information is read at step S37. At step S38, it is determined using the information read at step S38 whether the optical pickup 5 has arrived at the desired track. When the optical pickup 5 has not yet arrived at the desired track, the program returns to step S34 in order to calculate the number N of tracks once more, then the succeeding steps are executed. When the optical pickup 5 has arrived at the desired track at step S38, the search process ends.

Since, according to the embodiment, the track information is read subsequent to the track-jump operations of precisely N times, track information is read less frequently. Accordingly, the access time is minimized over that of conventional systems in which track information is read unconditionally after each and every track jump.

MODIFICATION

The present invention is not limited by the above embodiment in which it is determined, as at step S35, whether the number of tracks remaining is ten or less and singular track-jump operations are performed precisely for each of the remaining tracks. Another embodiment according to the present invention may include operations in which it is determined whether the remaining track number is fifty or less is and then a combination of incremental track-jump operations, such as a one-track jump operation, a three-track jump operation, or a five-track jump operation, etc., is performed.

The present invention can be applied to CD-I, CD-WO, CD-MO, CD-V and CD-Audio for 8-cm or 12-cm optical discs and Minidisc for 6.5 cm optical discs. These apparatuses, similarly to CD-ROM, operate under constant linear velocity (CLV) control. It can be also applied to laser disc reader or player for 20 cm or 30 cm optical discs which, similarly to the CD-ROM, operates under modified constant linear velocity (MCLV) control.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A seeking operation control apparatus which seeks a desired track along an optical disc in an optical disc reader, comprising:
    means translatable in the radial direction along said optical disk for reading track information stored in said optical disc;
    first means for calculating the number of tracks between a current position of said track-information reading means and said desired track, determined according to said track information read by said track-information reading means;
    means for driving said track-information reading means to jump tracks along said optical disc;
    means for controlling said drive means, whereby said track-information reading means jumps the track value calculated by said first calculating means;
    means for controlling said track-information reading means whereby said track information is read after the completion of track jump;
    first determination means for determining whether said track-information reading means has arrived at said desired track in accordance with said track information obtained by said reading control means;
    second means for calculating the number of tracks between the current position of said track-information reading means and said desired track when said first determination means has determined that said track information reading means is outside of said desired track, said driving means control means controls said driving means whereby said track-information reading means jumps the track value calculated by said first calculating means track by track;

said first calculating means executes a distance calculation based upon the track information corresponding to the current position of said track-information reading means and the track information of said desired track, and calculates a track value by employing said calculated distance;

third means for calculating the number of tracks between the current position of said track-information reading means and said desired track upon receiving a seeking command;

first rough access means for inducing said track information reading means to jump the track value calculated by said third track-number calculating means approximately to the desired track;

second determination means for determining, following said rough access, whether the number of tracks between the current position of said track-information reading means and said desired track is greater than a predetermined number; and second rough access means for inducing said track-information reading means to jump tracks approximately to said desired track, when said first determination means has determined that the number of tracks remaining is more than said predetermined track number.

2. An apparatus according to claim 1, wherein said driving-means control means controls said driving means, whereby said track-information reading means jumps the number of tracks calculated by said first track-number calculating means, when said second determination means has determined that the number of tracks remaining is not more than said predetermined number.

3. An apparatus according to claim 2, wherein said third calculating means executes a distance calculation based upon the track information corresponding to current position of said track-information reading means and the track information of said desired track, and calculates a track value by employing said calculated distance.

4. An apparatus according to claim 3, wherein said track-information reading means includes an optical pickup which irradiates said optical disc with a spotting beam and detects the reflected light.

5. An apparatus according to claim 4, wherein said optical pickup includes a lens for focusing said spotting beam.

6. An apparatus according to claim 5, wherein said lens is movable in both the radial direction and the axial direction with respect to said optical disc.

7. An apparatus according to claim 6 further comprising a focusing servocontroller for moving said lens in the axial direction, and a thread servocontroller for moving said optical pickup in the radial direction.

8. An apparatus according to claim 7, wherein said driving means induces said lens to execute single-track jumps.

9. An apparatus according to claim 1 further comprising:

second means for calculating the number of tracks between the current position of said track-information reading means and said desired track upon receiving a seeking command;

first rough access means for inducing said track-information reading means to jump the track value calculated by said second track-number calculating means approximately to the desired track;

first determination means for determining, after said rough access, whether the number of tracks between the current position of said track-information reading means and said desired track is greater than a predetermined number; and second rough access means for inducing said track-information reading means to jump tracks approximately to said desired track, when said first determination means has determined that the number of tracks remaining is greater than said predetermined track number.

10. An apparatus according to claim 9, wherein said driving-means control means controls said driving means, whereby said track-information reading means jumps the number of tracks calculated by said first track-number calculating means, when said first determination means has determined that the number of tracks remaining is not greater than said predetermined number.

11. An apparatus according to claim 10, wherein said second calculating means executes a distance calculation based upon the track information corresponding to the current position of said track-information reading means and the track information of said desired track, and calculates a track value by employing said calculated distance.

12. An optical disc reader for reading information stored in tracks composed of a spiral line on an optical disc, comprising:

means translatable in the radial direction along said optical disc for reading information stored in said optical disc;

means for receiving a seeking command from the exterior;

a track seeking controller for seeking a desired track when said command receiving means receives said seeking command; said track seeking controller including means for calculating the number of tracks between a current position of said information reading means and said desired track, determined according to said track information read by said track-information reading means; means for inducing said track-information reading means to jump tracks along said optical disc; means for controlling said driving means, whereby said track-information reading means jumps the track value calculated by said calculating means; and means for controlling said track-information reading whereby said track information is read after the completion of said track jump;

means for reproducing the information read by said information reading means;

said reading means including means for storing information; means for writing in and reading from said storing means; and means for correcting errors in the information stored in said storing means;

said reading means further including means for detecting synchronization signals stored in said optical disc in order to control said optical disc such that it rotates at a constant linear velocity; and said track seeking controller further includes first determination means for determining based upon the track information whether said track-information reading means has arrived at said desired track; a second calculating means for calculating the number of tracks between the current position of said track-information reading means and said desired track, when said first determination means has determined that said track-information reading means is outside of said desired track.

13. An apparatus according to claim 12, wherein said track search controller further includes:

third means for calculating the number of tracks between the current position of said track information reading means and said desired track upon receiving a seeking command;

first rough access means for inducing said track-information reading means to jump the track value calculated by said third track-number calculating means approximately to the desired track;

second determination means for determining, following said rough access, whether the number of tracks between the current position of said track-information reading means and said desired track is more than a predetermined number; and second rough access means for inducing said track-information reading means to jump tracks approximately to said desired track, when said second determination means has determined that the number of tracks remaining is more than said predetermined number.

14. An apparatus according to claim 13, wherein said driving-means control means is activated, when said second determination means has determined that the number of tracks remaining is not more than a predetermined number.

* * * * *